(12) United States Patent
Wu et al.

(10) Patent No.: US 8,767,094 B2
(45) Date of Patent: Jul. 1, 2014

(54) MEASUREMENT METHOD AND MEASUREMENT DEVICE

(75) Inventors: Chou-Lin Wu, Hsinchu (TW); Kuo-Chung Huang, New Taipei (TW); Kuen Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 330 days.

(21) Appl. No.: 13/197,739

(22) Filed: Aug. 3, 2011

(65) Prior Publication Data

US 2012/0242653 A1 Sep. 27, 2012

(30) Foreign Application Priority Data

Mar. 25, 2011 (CN) .......................... 2011 1 0077221

(51) Int. Cl.
*H04N 17/00* (2006.01)
*H04N 13/04* (2006.01)
*G02B 27/22* (2006.01)

(52) U.S. Cl.
CPC ....... *H04N 13/0402* (2013.01); *H04N 13/0447* (2013.01); *G02B 27/225* (2013.01); *H04N 13/0425* (2013.01); *H04N 17/004* (2013.01)
USPC ............................................. 348/236; 348/42

(58) Field of Classification Search
CPC .................................................. H04N 13/0425
USPC ...................................................... 348/42–60
See application file for complete search history.

(56) References Cited

U.S. PATENT DOCUMENTS

| 725,567 A | 4/1903 | Ives |
| 4,236,795 A * | 12/1980 | Kephart ............................. 396/5 |
| 5,703,686 A | 12/1997 | Leroux |
| 5,880,845 A | 3/1999 | Leroux |
| 6,556,284 B1 | 4/2003 | Leroux |
| 6,804,001 B1 | 10/2004 | Leroux |

(Continued)

FOREIGN PATENT DOCUMENTS

| CN | 101191942 | 6/2008 |
| CN | 101620816 | 1/2010 |
| WO | 2007029606 | 3/2007 |

OTHER PUBLICATIONS

Huang et al, "Measurement of Contrast Ratios for 3D Display", SPIE, Jan. 17, 2000, pp. 1-9.
Andrew Woods, "Understanding Crosstalk in Stereoscopic Displays", Three-Dimensional Systems and Applications, May 19-21, 2000, pp. 1-11.

(Continued)

*Primary Examiner* — Christopher S Kelley
*Assistant Examiner* — Jonathan Messmore
(74) *Attorney, Agent, or Firm* — Jianq Chyun IP Office

(57) ABSTRACT

A measurement method and a measurement device are disclosed. The measurement method is adapted to a 3D display capable of producing a plurality of viewing zones, which includes following steps. At least a part of a display area of the 3D display displays an image of one of the viewing zones. Light radiation amounts of a first position of the 3D display are detected with a light detector from different viewing angles. A viewing angle with a local maximum light radiation amount is taken as a reference viewing angle, a distance between the light detector and the 3D display along the reference viewing angle is changed, and light radiation amounts of a plurality of different second positions of the 3D display are detected in different distances. A distance at which light radiation amounts of the second positions are most uniform is taken as the optimal viewing distance.

32 Claims, 11 Drawing Sheets

(56) References Cited

U.S. PATENT DOCUMENTS

| | | | |
|---|---|---|---|
| 8,165,351 B2* | 4/2012 | Bendall | 382/106 |
| 2008/0266440 A1* | 10/2008 | Yazdanfar et al. | 348/340 |
| 2012/0105604 A1* | 5/2012 | Lim et al. | 348/51 |

OTHER PUBLICATIONS

Jarvenpaa et al., "Optical characterization of autostereoscopic 3-D displays", Journal of the SID, Aug. 16, 2008, pp. 825-833.

"First Office Action of China counterpart application" issued on Oct. 18, 2013, p. 1-p. 6.

* cited by examiner

MEASUREMENT METHOD AND MEASUREMENT DEVICE

CROSS-REFERENCE TO RELATED APPLICATION

This application claims the priority benefit of China application serial no. 201110077221.5, filed Mar. 25, 2011. The entirety of the above-mentioned patent application is hereby incorporated by reference herein and made a part of this specification.

TECHNICAL FIELD

The disclosure relates to a measurement method and a measurement device capable of measuring an optimal viewing distance of a three-dimensional display.

BACKGROUND

Along with development of display technology, displays with better image quality, richer color effect and better performance are continually developed. In recent years, a three-dimensional (3D) display technique has a development trend from cinema applications towards home applications. Since a key of the 3D display technique is to ensure a left eye and a right eye of a user to respectively view a left eye image and a right eye image of different viewing angles, according to the current 3D display technique, the user generally wears a pair of special glasses to filter the left eye images and the right eye images.

It is inconvenient for a user wearing the special glasses, especially for those wearing near-sighted or far-sighted glasses, it is inconvenient and uncomfortable to wear an extra pair of special glasses. Therefore, a naked-eye 3D display technique becomes one of research and development emphasises. A naked-eye 3D display is adapted to produce a plurality of viewing zones in space, and display images of different viewing angles in different viewing zones. When the left eye and the right eye of the user are respectively located at two adjacent viewing zones, the user can view images of two different viewing angles. In this way, the images of the two different viewing angles are combined in user's brain to form a 3D image.

However, the above situation is achieved when the user is located near an optimal viewing distance of the naked-eye 3D display. When the user views the naked-eye 3D display in a distance too longer than or too shorter than the optimal viewing distance, besides a poor image quality or a blurred image is probably obtained, incorrect brightness, contrast and images also probably occur, and the user's eyes may have an uncomfortable feeling. Therefore, it is an important issue of the 3D display technique to correctly find the optimal viewing distance of the naked-eye 3D display.

SUMMARY

An embodiment of the disclosure provides a measurement method, which is adapted to measure an optimal viewing distance of a three-dimensional (3D) display, where the 3D display is adapted to produce a plurality of viewing zones. The measurement method comprises following steps. At least a part of a display area of the 3D display is configured to display an image of one of the viewing zones. Light radiation amounts of a first position in the at least a part of the display area of the 3D display are detected with a light detector from different viewing angles. A viewing angle with a local maximum light radiation amount in the viewing angles is taken as a reference viewing angle, a distance between the light detector and the 3D display along the reference viewing angle is changed, and light radiation amounts of a plurality of different second positions in the at least a part of the display area of the 3D display are detected in different distances along the reference viewing angle. A distance at which light radiation amounts of the second positions are most uniform is taken as the optimal viewing distance.

An embodiment of the disclosure provides a measurement method, which is adapted to measure an optimal viewing distance of a 3D display, where the 3D display is adapted to produce a plurality of viewing zones. The measurement method comprises following steps. At least a part of a display area of the 3D display is configured to display an image of one of the viewing zones. Light radiation amounts of a plurality of first positions in the at least a part of the display area of the 3D display are detected with a light detector from different viewing angles. A viewing angle with a local maximum light radiation amount in the viewing angles of each of the measured first positions is taken as a reference viewing angle, and a plurality of intersections of a plurality of reference axes extending from the first positions along the reference viewing angles are taken as a plurality of detection positions. Light radiation amounts of a plurality of different second positions in the at least a part of the display area of the 3D display are detected at the different detection positions. A distance between the detection position at which light radiation amounts of the second positions are most uniform and the 3D display is taken as the optimal viewing distance.

An embodiment of the disclosure provides a measurement device, which is adapted to measure an optimal viewing distance of a 3D display, where the 3D display is adapted to produce a plurality of viewing zones. The measurement device comprises a rotation carrier, a track, a light detector and a processing unit. The rotation carrier is used for carrying the 3D display, and is adapted to rotate the 3D display. The track is extended from one end closed to the rotation carrier to another end away from the rotation carrier. The light detector is disposed on the track, where the light detector is adapted to move along the track, and is adapted to rotate relative to the track. The processing unit is electrically connected to the light detector, and is configured to store a plurality of viewing angles of the light detector relative to the 3D display, a plurality of different distances of the light detector relative to the 3D display, and light radiation amounts of a plurality of different positions on the 3D display that are detected from the viewing angles and the distances, and is configured to find the optimal viewing distance according to the distances and the light radiation amounts.

An embodiment of the disclosure provides a measurement method, which is adapted to measure an optimal viewing distance of a 3D display, where the 3D display is adapted to produce a plurality of viewing zones. The measurement method comprises following steps. The 3D display is configured to display images of a plurality of points in one of the viewing zones. Light radiation amounts of the points are detected with a light detector in a plurality of light receiving planes departed from the 3D display by a plurality of different distances. A distance of the light receiving plane at which light radiation amounts of the points are more uniform is taken as the optimal viewing distance.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
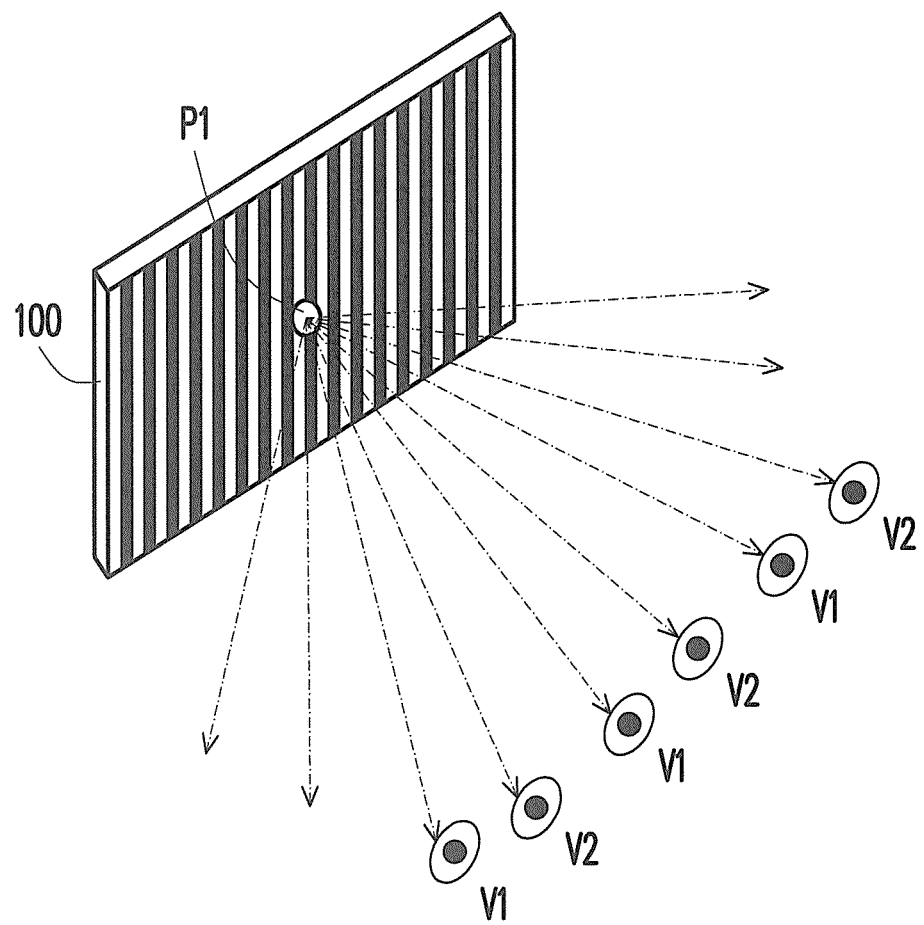
FIGS. 1A-1G are schematic diagrams illustrating a flow of a measurement method according to an exemplary embodiment.

FIGS. 1A-1G are schematic diagrams illustrating a flow of a measurement method according to an exemplary embodiment. Referring to FIG. 1A, the measurement method of the present exemplary embodiment is adapted to measure an optimal viewing distance of a three-dimensional (3D) display 100. In the present exemplary embodiment, the 3D display 100 is a naked-eye 3D display, which is adapted to produce a plurality of viewing zones. In the present exemplary embodiment, the 3D display 100 is a dual-viewing zone 3D display, which is adapted to produce a plurality of alternating viewing zones V1 and V2 in space. The 3D display 100 is adapted to transmit a first image representing a certain viewing angle to the viewing zones V1, and is adapted to transmit a second image representing another viewing angle to the viewing zones V2. When a left eye and a right eye of a user are respectively located at the two adjacent viewing zones V1 and V2, the left eye can view the first image and the right eye can view the second image. In this way, the first image and the second image are combined in user's brain to form a 3D image.

The measurement method comprises following steps. First, referring to FIG. 1B, the 3D display 100 displays an image of one (e.g., the viewing zone V1) of the viewing zones (for example, the viewing zones V1 and V2). In the present exemplary embodiment, the image is, for example, an all white image, and the image of the other viewing zones (for example, the viewing zone V2) is an all black image. However, in other embodiments, the viewing zone V2 may also be the all white image, and the viewing zone V1 may be the all black image. Alternatively, in the other embodiments, the all white image can be replaced by an all first color image.

Figure 1B:
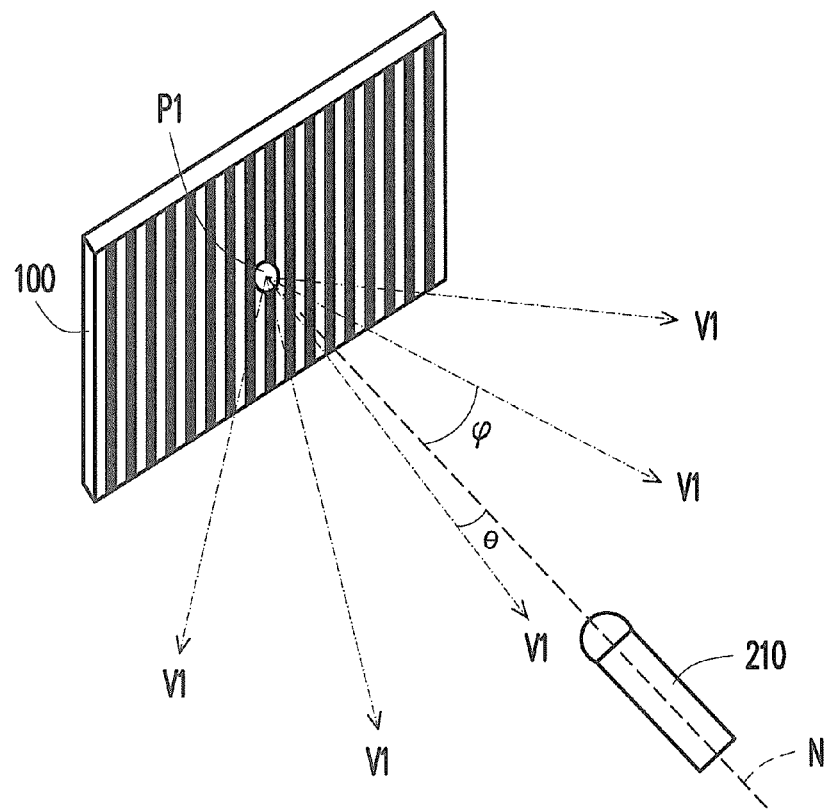
Figure 1C:
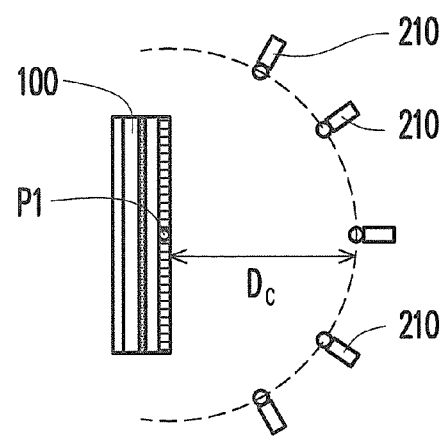

Then, referring to FIG. 1B and FIG. 1C, light radiation amounts of a first position P1 on the 3D display 100 is detected with a light detector 210 from different viewing angles. In the present exemplary embodiment, the light detector 210 is, for example, a luminance meter, and the light radiation amount is, for example, luminance. Moreover, in the present exemplary embodiment, when the light detector 210 detects the first position P1 from different viewing angles, a fixed distance $D_c$ is always maintained between the light detector 210 and the first position P1. However, in the other embodiments, when the light detector 210 detects the first position P1 from different viewing angles, it does not maintain a fixed distance from the first position P1. According to a detecting result, a relationship between the light intensity (which is luminance in the present exemplary embodiment) and the viewing angle is as that shown in FIG. 1D, i.e., that a distribution of the light intensity is obtained, where 0 degree represents a normal line direction of a display plane of the 3D display 100, and positive angles and negative angles respectively represent angles rotated leftwards and rightwards from the normal line direction.

Figure 1D:
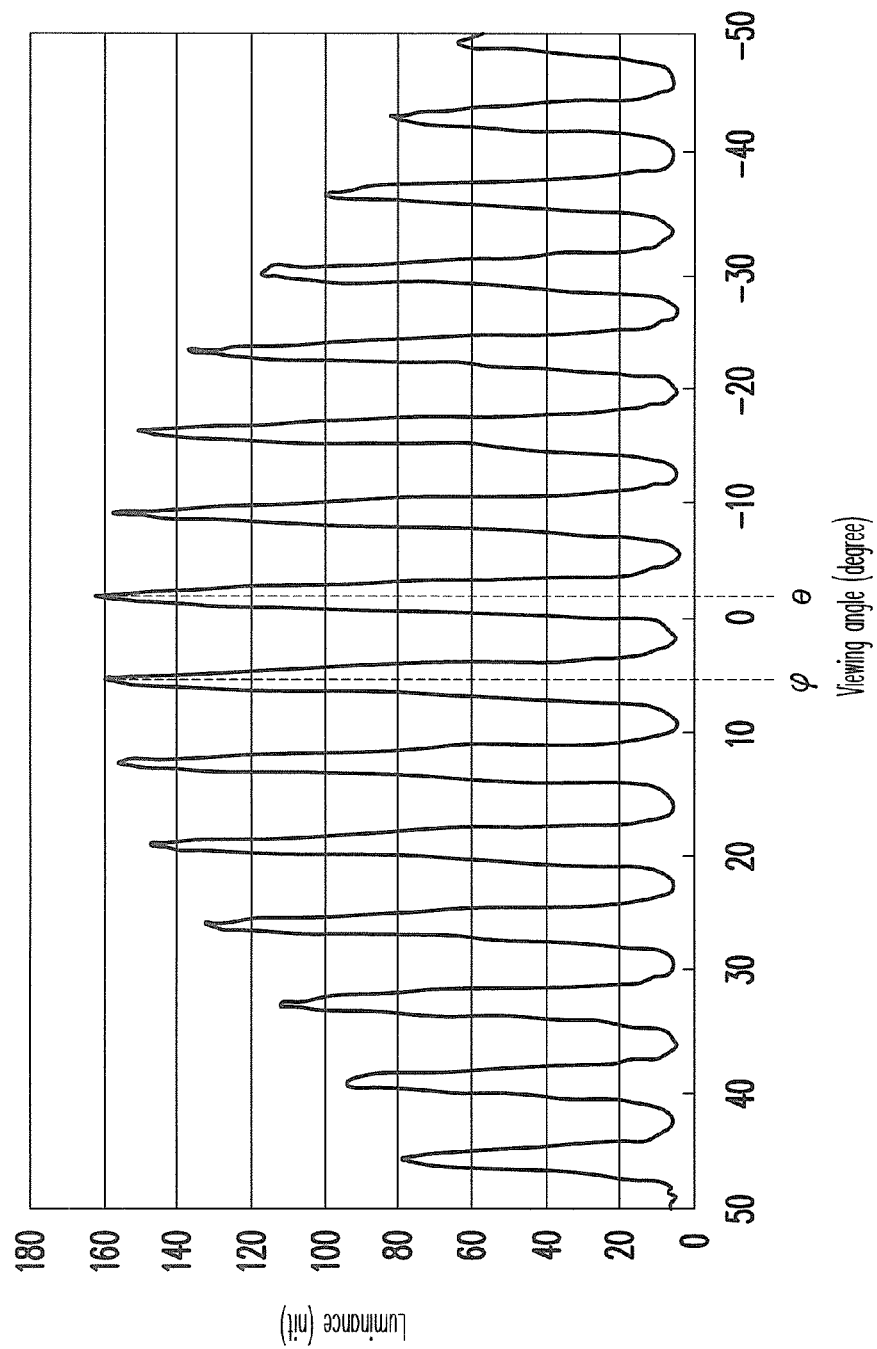

Then, referring to FIG. 1D, a viewing angle with a local maximum light radiation amount in the viewing angles is taken as a reference viewing angle. In the present exemplary embodiment, a viewing angle θ is taken as the reference viewing angle. However, in the other embodiments, another viewing angle (for example, a viewing angle φ) with the local maximum light radiation amount can also be taken as the reference viewing angle. Then, referring to FIG. 1E and FIG. 1F, a distance between the light detector 210 and the 3D display 100 along the reference viewing angle (i.e. the viewing angle θ) is changed. For example, the light detector 210 is moved from a distance D1 to a distance D2, and detects light radiation amounts of a plurality of different second positions P2 on the 3D display 100 in different distances. In the present exemplary embodiment, the second positions P2 comprise 9 positions of P21-P29. In this way, a relationship between the light radiation amounts (for example, luminance) of the second positions P2 and distances between the light detector 210 and the 3D display 100 can be obtained as that shown in FIG. 1G. In the present exemplary embodiment, one of the second positions P2 (for example, the position P25) is the first position P1, though in the other embodiments, the second positions P2 can be all different from the first position P1. Moreover, when the light detector 210 is used to detect the second positions P2, the light detector 210 can be rotated to align with the second positions P2.

Figure 1E:
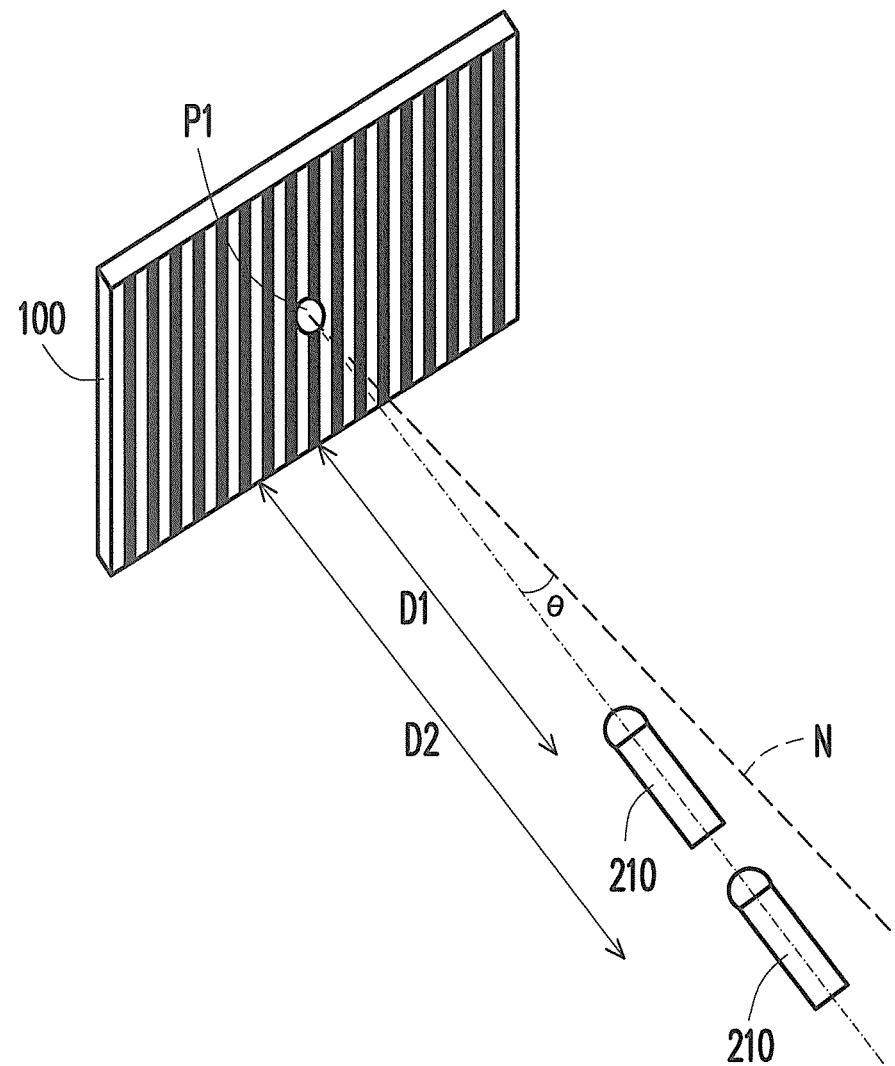
Figure 1F:
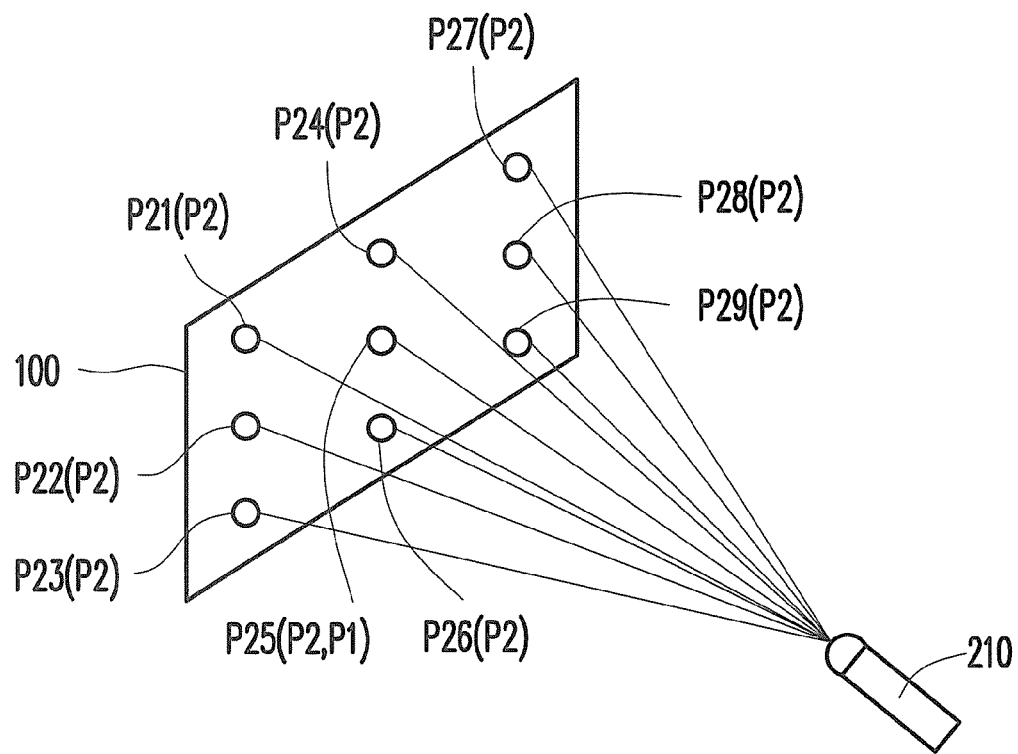
Figure 1G:
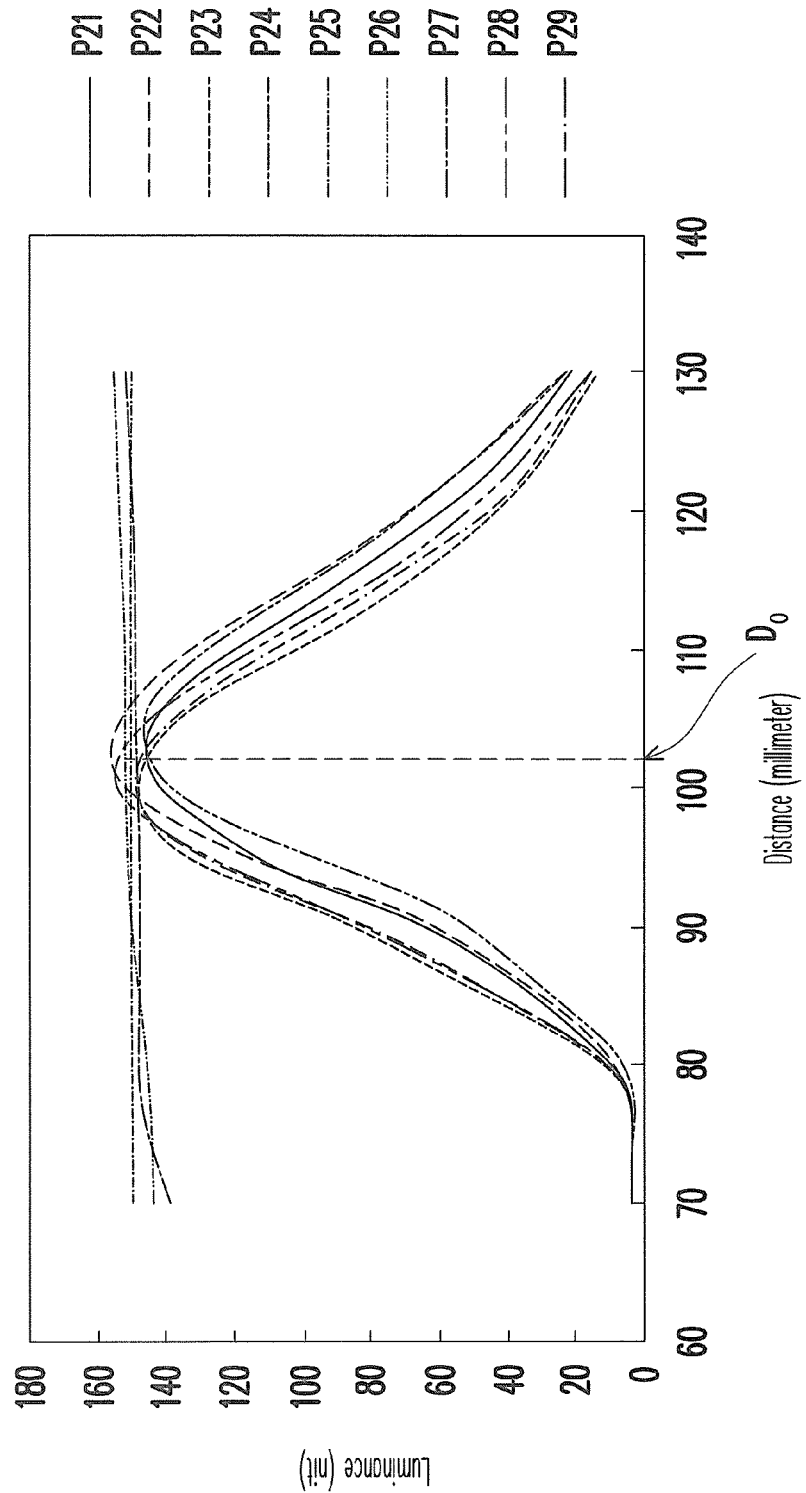

Then, referring to FIG. 1G, a distance at which light radiation amounts of the second positions P2 are most uniform is taken as an optimal viewing distance $D_o$. For example, the distance corresponding to a situation that the curves of FIG. 1G are closest to each other can be selected as the optimal viewing distance $D_o$. In the present exemplary embodiment, the step of selecting the distance at which light radiation amounts of the second positions P2 are most uniform as the optimal viewing distance $D_o$ comprises following steps. First, a minimum value in the light radiation amounts of the second positions P2 detected at each distance is divided by a maximum value therein to obtain a ratio. Then, the distance corresponding to a maximum ratio is taken as the optimal viewing distance $D_o$. In other words, the greater the ratio is, the closer it approaches to 1, and the closer the minimum value and the maximum value are, and the more uniform the light radiation amounts of the second positions P2 are. Namely, uniformity of the light radiation amounts can be defined as the maximum value divided by the minimum value times 100%, and the distance corresponding to the most uniform light radiation amounts is, for example, a distance corresponding to the maximum uniformity (which approaches to 100%).

In the measurement method of the present exemplary embodiment, since the distance corresponding to the most uniform light radiation amounts is taken as the optimal viewing distance when the 3D display 100 displays the image of a single viewing zone, the optimal viewing distance obtained according to the measurement method of the present exemplary embodiment is indeed very close to or substantially equal to a best distance for viewing the 3D display 100. When the user views the 3D display 100 from the optimal viewing distance, besides a clear image with good quality is viewed, the light radiation amount of the image is also correct and even, so that the user can comfortably view the 3D image.

In the present exemplary embodiment, a whole display area of the 3D display 100 is used to display the image of one of the viewing zones, and the first position P1 and the second positions P2 can be some positions in the whole display area of the 3D display 100. However, in another exemplary embodiment, a partial area of the display area of the 3D display 100 is used to display the image of one of the viewing zones, and the measured first position P1 and the second positions P2 are located in the partial area. In this way, the measurement method of the partial area display can also accurately measure the optimal viewing distance of the 3D display 100.

Figure 2A:
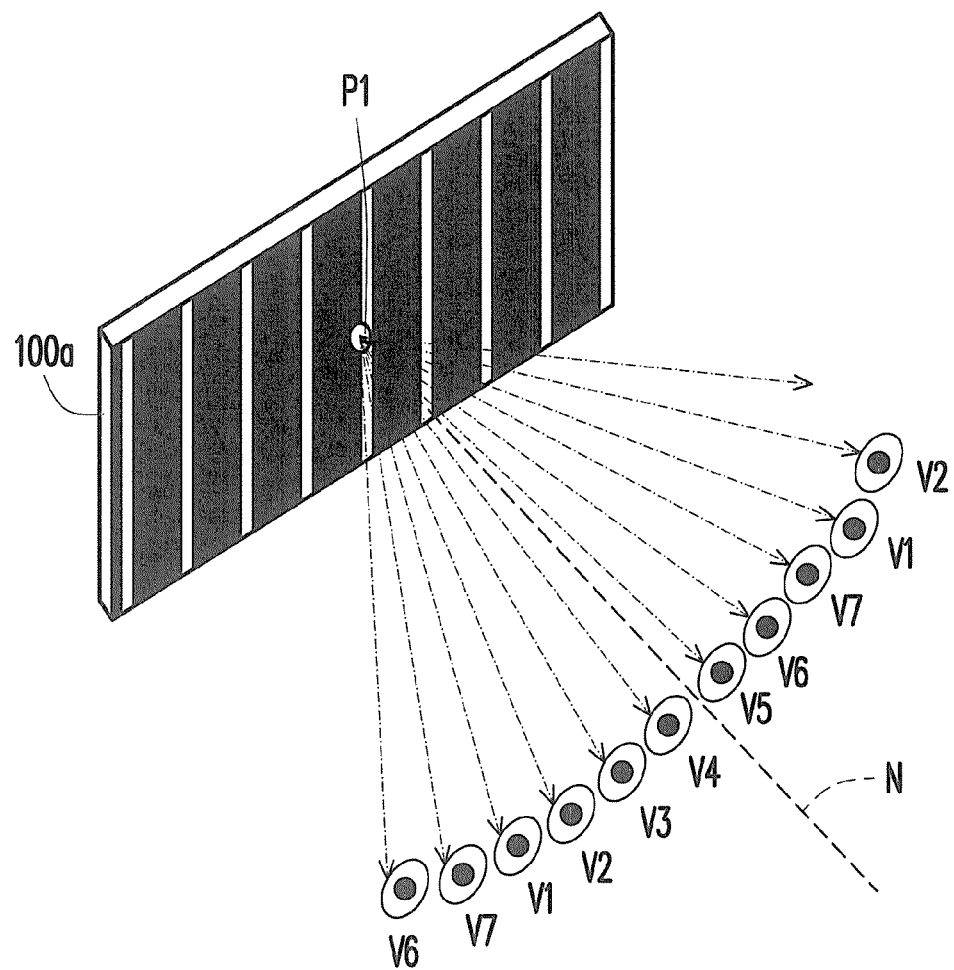
FIGS. 2A-2C are schematic diagrams illustrating a partial flow of a measurement method according to another exemplary embodiment.
Figure 2B:
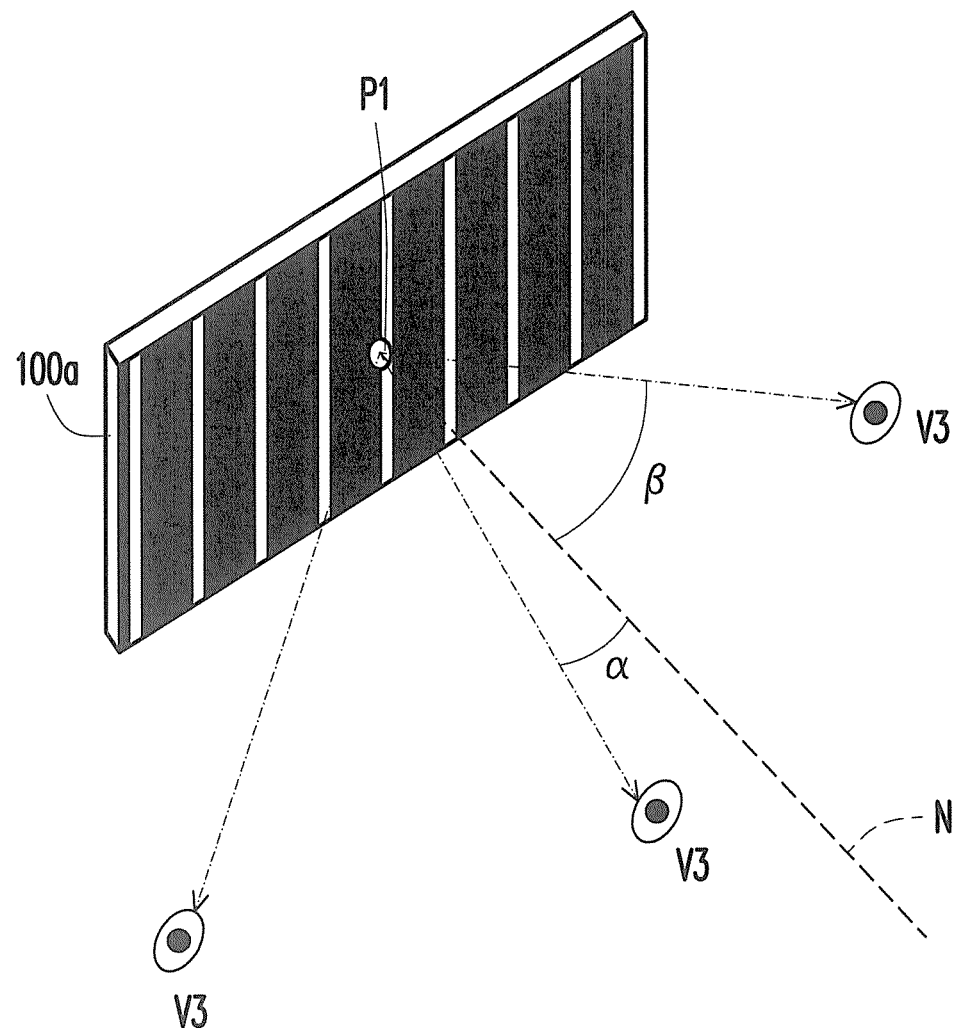
Figure 2C:
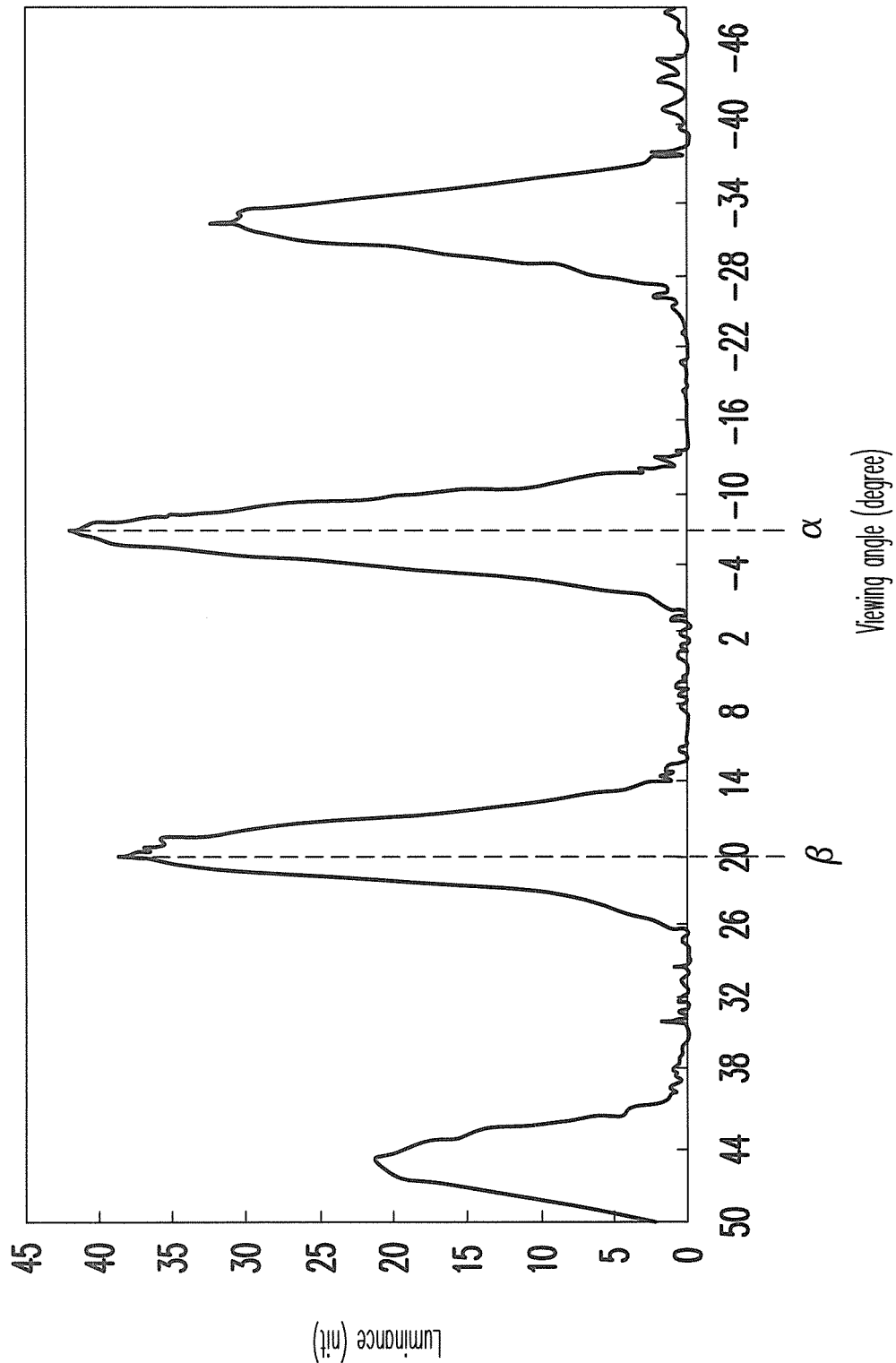

FIGS. 2A-2C are schematic diagrams illustrating a partial flow of a measurement method according to another exemplary embodiment of the disclosure. The measurement method of the present exemplary embodiment is similar to the measurement method of FIGS. 1A-1G, and differences therebetween are described below, while the same parts thereof can refer to the related description of FIGS. 1A-1G, which are not repeated. Referring to FIG. 2A, a 3D display 100a of the present exemplary embodiment is a 3D display with more than two viewing zones, and in FIG. 2A, the 3D display 100a of 7 viewing zones (a viewing zone V1 through a viewing zone V7) is illustrated, where the 7 viewing zones are sequentially and repeatedly appeared in the space. When the left eye and the right eye of the user are respectively located at the viewing zone V1 and the viewing zone V2, a 3D image of a first viewing angle can be viewed. When the left eye and the right eye of the user are respectively located at the viewing zone V2 and the viewing zone V3, a 3D image of a second viewing angle can be viewed. When the left eye and the right eye of the user are respectively located at a viewing zone VN and a viewing zone V(N+1), a 3D image of a $N^{th}$ viewing angle can be viewed, where N is a positive integer ranging of 1-6. Alternatively, in the other embodiments, the left eye and the right eye of the user can be located at two viewing zones that are not adjacent to each other. For example, the left eye and the right eye of the user can be respectively located at the viewing zone VN and a viewing zone V(N+2), alternatively, the left eye and the right eye of the user can be respectively located at the viewing zone VN and a viewing zone V(N+3). In other words, the left eye and the right eye of the user can be respectively located at the viewing zone VN and a viewing zone V(N+K), where K is a natural number, and in this way, the user can also view the 3D image. Then, referring to FIG. 2B, the step of FIG. 2B is similar to the step of FIG. 1B, and in both of the exemplary embodiments, the 3D display displays the image of only one of the viewing zones, and a difference there between is that the number of the viewing zones of the 3D display 100a is more than two, so that in the step of FIG. 2B, more than one other viewing zones display the all black image. For example, the viewing zone V3 can display the all white image, and the viewing zones V1-V2 and V4-V7 display the all black image. Alternatively, in the other embodiment, the aforementioned all white image can be replaced by an all first color image.

Then, referring to FIG. 2C, the step of FIG. 2C is similar to the step of FIG. 1D, and a difference therebetween is that in the present exemplary embodiment, more viewing zones display the all black image, so that a difference of the viewing angles corresponding to the two adjacent local maximum light radiation amounts (i.e. luminance) is greater. However, the method of selecting a viewing angle (for example, a viewing angle α) with the local maximum light radiation amount in the viewing angles as the reference viewing angle is similar to that of the embodiment of FIG. 1D. In the other embodiments, another viewing angle (for example, a viewing angle β) with the local maximum light radiation amount can also be taken as the reference viewing angle. Then, in the present exemplary embodiment, a distance between the light detector and the 3D display 100a along the reference viewing angle is changed, and light radiation amounts of a plurality of different second positions on the 3D display 100a are detected in different distances, and a distance at which light radiation amounts of the second positions are more uniform is taken as the optimal viewing distance, where detailed steps thereof are the same as that described in the embodiment of FIG. 1E-FIG. 1G, which are not repeated herein.

Therefore, the measurement method of the present exemplary embodiment is adapted to a 3D display with 3 or more viewing zones.

In the present exemplary embodiment, a whole display area of the 3D display 100a is used to display the image of one of the viewing zones, and the first position and the second positions can be some positions in the whole display area of the 3D display 100a. However, in another exemplary embodiment, a partial area of the display area of the 3D display 100a is used to display the image of one of the viewing zones, and the measured first position and the second positions are located in the partial area. In this way, the measurement method of the partial area display can also accurately measure the optimal viewing distance of the 3D display 100a.

Figure 3:
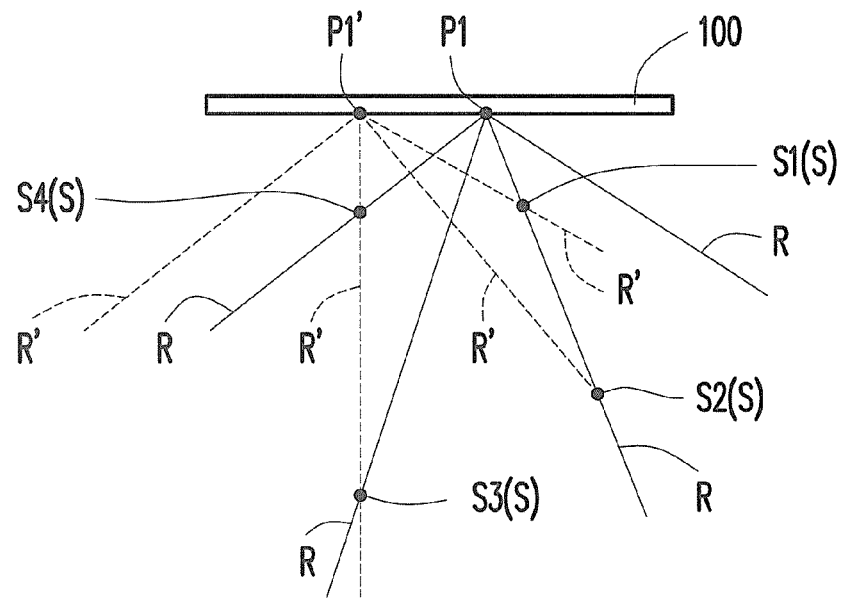
FIG. 3 is a schematic diagram illustrating one of steps of a measurement method according to still another exemplary embodiment.

FIG. 3 is a schematic diagram illustrating one of steps of a measurement method according to still another exemplary embodiment. Referring to FIG. 3, the measurement method of the present exemplary embodiment is similar to the measurement method of FIGS. 1A-1G, and differences therebetween are described below. In the present exemplary embodiment, the light detector is unnecessary to be moved from the distance D1 to the distance D2 step by step to detect the light radiation amounts as that shown in FIG. 1E. Instead, in the measurement method of the present exemplary embodiment, light radiation amounts (for example, luminance) of a plurality of first positions (for example, a first position P1 and a first position P1' of FIG. 3) on the 3D display 100 are each measured in different viewing angles. In the present exemplary embodiment, the different first positions are substantially arranged on a same horizontal line of the 3D display 100. Then, a viewing angle with a local maximum light radiation amount in the viewing angles of each of the measured first positions P1 and P1' is taken as the reference viewing angle, and a plurality of intersections of a plurality of reference axes R and R' extending from the first positions P1 and P1' along the reference viewing angles are taken as a plurality of detection positions S (for example, detection positions S1-S4). The viewing angles with the local maximum light radiation amounts may be referred to the viewing angles corresponding to the peaks of FIG. 1D, which are not repeated herein.

Then, light radiation amounts of a plurality of different second positions (for example, the second positions P2 shown in FIG. 1F) of the 3D display are detected at the different detection positions S. Then, a distance between a detection position at which light radiation amounts of the second positions are more uniform and the 3D display is taken as the optimal viewing distance. In the present embodiment, determination of the most uniform light radiation amounts can be as that described in the embodiment of FIG. 1G, by which a maximum one (which approaches to 1 most) of the ratios between the minimum values of the light radiation amounts of the second positions and the maximum values thereof is adopted. In the present exemplary embodiment, at least a part of the second positions are respectively at least a part of the first positions. For example, the second position P25 (referring to FIG. 1F) is the first position P1 (referring to FIG. 3), and the second position P22 (referring to FIG. 1F) is the first position P1' (referring to FIG. 3). However, in other embodiments, the second positions P2 can be all different from the first positions P1 and P1'.

Moreover, the measurement method of the present exemplary embodiment can also be applied to 3D displays with the viewing zone greater than 2, for example, the 3D display 100a of FIG. 2A.

In the present exemplary embodiment, a whole display area of the 3D display 100 is used to display the image of one of the viewing zones, and the first positions and the second positions can be some positions in the whole display area of the 3D display 100. However, in another exemplary embodiment, a partial area of the display area of the 3D display 100 is used to display the image of one of the viewing zones, and the measured first position and the second positions are located in the partial area. In this way, the measurement method of the partial area display can also accurately measure the optimal viewing distance of the 3D display 100.

Figure 4:
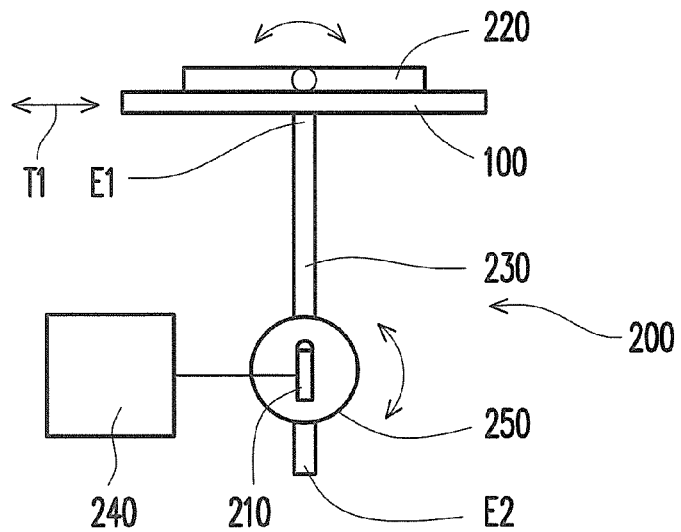
FIG. 4 is a schematic view of a measurement device according to an exemplary embodiment.

FIG. 4 is a schematic view of a measurement device according to an exemplary embodiment of the disclosure. Referring to FIG. 4, the measurement device 200 of the present exemplary embodiment is adapted to execute the measurement method of FIGS. 1A-1G, the measurement method of FIGS. 2A-2C, or the measurement method of FIG. 3. The measurement device 200 is adapted to measure the optimal viewing distance of the 3D display 100 or the 3D display 100a, and the 3D display 100 is taken as an example for description. The measurement device 200 comprises a rotation carrier 220, a track 230, a light detector 210 and a processing unit 240. The rotation carrier 220 is used for carrying the 3D display 100, and is adapted to rotate the 3D display 100. The track 230 is extended from one end E1 closed to the rotation carrier 220 to another end E2 away from the rotation carrier 220.

The light detector 210 is disposed on the track 230, where the light detector 210 is adapted to move along the track 230, and is adapted to rotate relative to the track 230. In the present exemplary embodiment, a carrier platform 250 is disposed on the track 230, and the light detector 210 is disposed on the carrier platform 250. The carrier platform 250 is adapted to move along the track 230 to drive the light detector 210 moving along the track. Moreover, the carrier platform 250 is adapted to rotate to drive the light detector 210 rotating. In the present exemplary embodiment, the first end E1 of the track 230 can be directly connected to the rotation carrier 220 or connected to the rotation carrier 220 through other mechanisms.

The processing unit 240 is electrically connected to the light detector 210, and is configured to store a plurality of viewing angles of the light detector 210 relative to the 3D display 100, a plurality of different distances of the light detector 210 relative to the 3D display 100, and light radiation amounts (for example, luminance) of a plurality of different positions on the 3D display 100 that are detected from the viewing angles and the distances, and is configured to find the optimal viewing distance according to the distances and the light radiation amounts.

In detail, when the measurement device 200 of the present exemplary embodiment is used to execute the measurement method of FIGS. 1A-1G, and when the 3D display 100 displays the image of one of the viewing zones, the processing unit 240 stores the light radiation amounts of the first position P1 (referring to FIG. 1C) on the 3D display 100 that are detected by the light detector 210 from the aforementioned viewing angles. In detail, when the step of FIG. 1C is executed, the rotation carrier 220 drives the 3D display 100 to rotate, and such motion is equivalent to an effect that the light detector 210 rotates relative to the 3D display 100, and in this way, the viewing angle of light detector 210 relative to the 3D display 100 is constantly changed, so as to implement the step of FIG. 1C. Moreover, the processing unit 240 selects a viewing angle with a local maximum light radiation amount in the viewing angles to serve as a reference viewing angle, i.e., that the step of FIG. 1D is executed.

When a distance between the light detector 210 and the 3D display 100 along the reference viewing angle is changed, the processing unit 240 stores the light radiation amounts of a plurality of different second positions P2 (referring to FIG. 1F) on the 3D display 100 that are detected at different distances. In detail, when the steps of FIG. 1E and FIG. 1F are executed, the carrier platform 250 can be moved on the track 230 to change the distance between the light detector 210 and the 3D display 100. Moreover, the rotation carrier 220 can be rotated to facilitate the light detector 210 aligning the different second positions P2.

Then, the processing unit 240 selects a distance at which light radiation amounts of the second positions P2 are most uniform as the optimal viewing distance, i.e., that the processing unit 240 executes the step of FIG. 1G. Details of the step of FIG. 1G are as that described above, which is not repeated herein.

Moreover, referring to FIG. 3 and FIG. 4, when the measurement device 200 of the present exemplary embodiment is used to execute the measurement method of FIG. 3, and when the 3D display 100 displays the image of one of the viewing zones, the processing unit 240 stores the light radiation amounts of the first positions P1 and P1' on the 3D display 100 that are detected by the light detector 210 from different viewing angles. In detail, the 3D display 100 can be shifted relative to the rotation carrier 220, for example, shifted along a direction T1. In this way, the light detector 210 can detect the first position P1 and the first position P1' each from different viewing angles.

Moreover, the processing unit 240 selects a viewing angle with a local maximum light radiation amount in the viewing angles of each of the measured first positions P1, P1' as a reference viewing angle, and takes a plurality of intersections of a plurality of reference axes R and R' extending from the first positions P1 and P1' along the reference viewing angles as a plurality of detection positions S. In addition, the processing unit 240 stores the light radiation amounts of a plurality of different second positions P2 (referring to FIG. 1F) on the 3D display 100 that are detected at the different detection positions S, and the processing unit 240 selects a distance between a detection position at which light radiation amounts of the second positions P2 are most uniform and the 3D display 100 as the optimal viewing distance. Detailed steps executed by the processing unit 240 are as that described in the aforementioned embodiment, which are not repeated herein.

Moreover, in another exemplary embodiment, the processing unit 240 can also be electrically connected to the rotation carrier 220 and the carrier platform 250 for driving the rotation carrier 220 to rotate and driving the carrier platform 250 to move or rotate relative to the track 230. Alternatively, the processing unit 240 can also drive the 3D display 100 to shift relative to the rotation carrier 220 through an actuator.

Figure 5A:
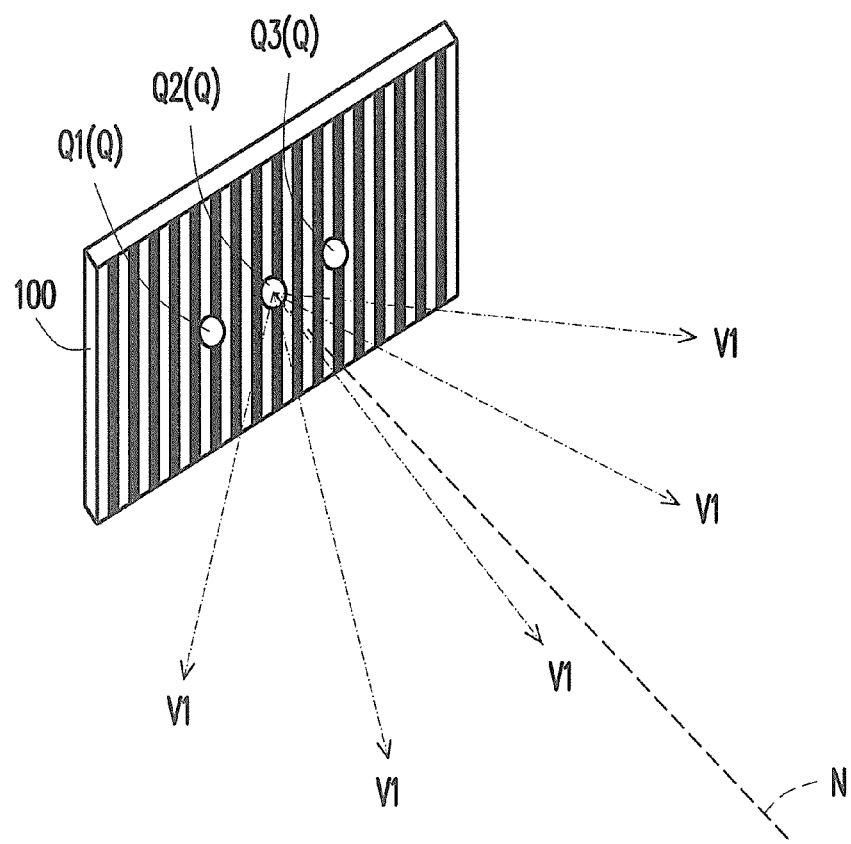
FIGS. 5A and 5B are schematic diagrams illustrating a flow of a measurement method according to yet another exemplary embodiment.
Figure 5B:
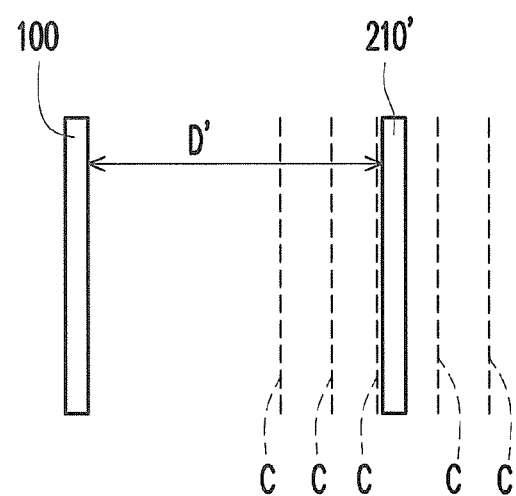

FIGS. 5A and 5B are schematic diagrams illustrating a flow of a measurement method according to yet another exemplary embodiment. Referring to FIGS. 5A and 5B, the measurement method of the present exemplary embodiment is adapted to measure the optimal viewing distance of the 3D display 100 (referring to FIG. 1A) or the 3D display 100a (referring to FIG. 2A), and the 3D display 100 is taken as an example for description. The measurement method of the present exemplary embodiment comprises following steps. First, referring to FIG. 5A, the 3D display 100 displays images of a plurality of points Q (in FIG. 5A, three points Q1, Q2 and Q3 are taken as an example) in one of the viewing zones (for example, the viewing zone V1). In the present exemplary embodiment, the light radiation amounts of the images of the points Q displayed by the 3D display 100 in one of the viewing zones (the viewing zone V1) are substantially the same, which are, for example, dots or planes of all white image, or dots or planes of all other color image, for example, dots or planes of all green image.

Then, referring to FIG. 5B, light radiation amounts of the points Q is detected with a light detector 210' on a plurality of light receiving planes C departed from the 3D display by different distances. Then, a distance (for example, D') of the light receiving plane C at which light radiation amounts of the points Q are most uniform is taken as the optimal viewing distance. In the present exemplary embodiment, the light detector 210' is, for example, an illuminometer, and the light radiation amount is, for example, illumination. Moreover, in the present exemplary embodiment, a following uniformity equation is used to determine whether the light radiation amount is uniform:

Uniformity=(minimum light radiation amount/maximum light radiation amount)×100%

The light receiving plane C with maximum uniformity of the light radiation amounts is represented as the light receiving plane C of the most uniform light radiation amounts.

In the measurement method of the present exemplary embodiment, since the distance corresponding to the most uniform light radiation amounts is taken as the optimal viewing distance when the 3D display 100 displays the image of the single viewing zone, the optimal viewing distance obtained according to the measurement method of the present exemplary embodiment is indeed very close to or substantially equal to a best distance for viewing the 3D display 100. When the user views the 3D display 100 from the optimal viewing distance, besides a clear image with good quality is viewed, the light radiation amount of the image is also correct and uniform, so that the user can comfortably view the 3D image.

In summary, in the measurement method and the measurement device of the disclosure, since the distance corresponding to the most uniform light radiation amounts is taken as the optimal viewing distance when the 3D display displays the image of the single viewing zone, the optimal viewing distance obtained according to the measurement method and the measurement device of the present exemplary embodiment is indeed very close to or substantially equal to a best distance for viewing the 3D display. When the user views the 3D display from the optimal viewing distance, besides a clear image with good quality are viewed, the light radiation amount of the image is also correct and uniform, so that the user can comfortably view the 3D image.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A measurement method adapted to measure an optimal viewing distance of a three-dimensional (3D) display, the 3D display being adapted to produce a plurality of viewing zones, the measurement method comprising:
    configuring at least a part of a display area of the 3D display to display an image of one of the viewing zones;
    detecting light radiation amounts of a first position in the at least a part of the display area of the 3D display with a light detector from different viewing angles;
    selecting a viewing angle with a local maximum light radiation amount in the viewing angles as a reference viewing angle, changing a distance between the light detector and the 3D display along the reference viewing angle, and detecting light radiation amounts of a plurality of second positions in the at least a part of the display area of the 3D display in different distances along the reference viewing angle, wherein the second positions are different from each other; and
    selecting a distance at which light radiation amounts of the second positions are most uniform as the optimal viewing distance.

2. The measurement method as claimed in claim 1, wherein the step of selecting the distance at which light radiation amounts of the second positions are most uniform as the optimal viewing distance comprises:
    dividing a minimum value in the light radiation amounts of the second positions detected at each of the distances by a maximum value therein to obtain a ratio; and
    taking the distance corresponding to a maximum ratio as the optimal viewing distance.

3. The measurement method as claimed in claim 1, wherein one of the second positions is the first position.

4. The measurement method as claimed in claim 1, wherein the image of one of the viewing zones displayed on said at least a part of the display area of the 3D display is an all first color image.

5. The measurement method as claimed in claim 4, wherein said all first color image is an all white image.

6. The measurement method as claimed in claim 4, further comprising configuring said at least a part of the display area of the 3D display to display an all second color image in other viewing zones, wherein the first color is different from the second color.

7. The measurement method as claimed in claim 1, wherein the light detector is a luminance meter, and the light radiation amount is luminance.

8. A measurement method adapted to measure an optimal viewing distance of a three-dimensional (3D) display, the 3D display being adapted to produce a plurality of viewing zones, the measurement method comprising:
    configuring at least a part of a display area of the 3D display to display an image of one of the viewing zones;
    detecting light radiation amounts of a plurality of first positions in the at least a part of the display area of the 3D display with a light detector from different viewing angles, wherein the first positions are different from each other;
    selecting a viewing angle with a local maximum light radiation amount in the viewing angles of each of the measured first positions as a reference viewing angle, and taking a plurality of intersections of a plurality of reference axes extending from the first positions along the reference viewing angles of the first positions as a plurality of detection positions;
    detecting light radiation amounts of a plurality of second positions in the at least a part of the display area of the 3D display at the different detection positions, wherein the second positions are different from each other; and selecting a distance between the detection position at which light radiation amounts of the second positions are more uniform and the 3D display as the optimal viewing distance.

9. The measurement method as claimed in claim 8, wherein the step of selecting the distance between the detection position at which light radiation amounts of the second positions are more uniform and the 3D display as the optimal viewing distance comprises:

dividing a minimum value in the light radiation amounts of the second positions detected at each of the detection positions by a maximum value therein to obtain a ratio; and taking a distance between the detection position corresponding to a maximum ratio and the 3D display as the optimal viewing distance.

10. The measurement method as claimed in claim 8, wherein at least a part of the second positions are respectively at least a part of the first positions.

11. The measurement method as claimed in claim 8, wherein the image of one of the viewing zones displayed on said at least a part of the display area of the 3D display is an all first color image.

12. The measurement method as claimed in claim 11, wherein said all first color image is an all white image.

13. The measurement method as claimed in claim 11, further comprising configuring said at least a part of the display area of the 3D display to display an all second color image in other viewing zones, wherein the first color is different from the second color.

14. The measurement method as claimed in claim 8, wherein the light detector is a luminance meter, and the light radiation amount is luminance.

15. The measurement method as claimed in claim 8, wherein the different first positions are substantially arranged on a same horizontal line of the 3D display.

16. A measurement device adapted to measure an optimal viewing distance of a three-dimensional (3D) display, the 3D display being adapted to produce a plurality of viewing zones, the measurement device comprising:

a rotation carrier, configured to carry the 3D display, and adapted to rotate the 3D display;

a track, extending from one end close to the rotation carrier to another end away from the rotation carrier;

a light detector, disposed on the track, wherein the light detector is adapted to move along the track, and is adapted to rotate relative to the track; and a processing unit, electrically connected to the light detector, configured to store a plurality of viewing angles of the light detector relative to the 3D display, a plurality of different distances of the light detector relative to the 3D display and light radiation amounts of a plurality of different positions on the 3D display that are detected from the viewing angles and the distances, and configured to find the optimal viewing distance according to the distances and the light radiation amounts.

17. The measurement device as claimed in claim 16, wherein when at least a part of a display area of the 3D display displays an image of one of the viewing zones, the processing unit stores light radiation amounts of a first position in the at least a part of the display area of the 3D display that are detected by the light detector from the viewing angles, and selects a viewing angle with a local maximum light radiation amount in the viewing angles as a reference viewing angle, and when a distance between the light detector and the 3D display along the reference viewing angle is changed, the processing unit stores light radiation amounts of a plurality of second positions in the at least a part of the display area of the 3D display that are detected in different distances, wherein the second positions are different from each other.

18. The measurement device as claimed in claim 17, wherein the processing unit selects a distance at which light radiation amounts of the second positions are most uniform as the optimal viewing distance.

19. The measurement device as claimed in claim 18, wherein selecting the distance at which light radiation amounts of the second positions are most uniform as the optimal viewing distance comprises:

dividing a minimum value in the light radiation amounts of the second positions detected at each of the distances by a maximum value therein to obtain a ratio; and taking the distance corresponding to a maximum ratio as the optimal viewing distance.

20. The measurement device as claimed in claim 17, wherein one of the second positions is the first position.

21. The measurement device as claimed in claim 17, wherein the image of one of the viewing zones displayed on said at least a part of the display area of the 3D display is an all first color image.

22. The measurement method as claimed in claim 21, wherein said all first color image is an all white image.

23. The measurement device as claimed in claim 21, wherein when the image of one of the viewing zones displayed on said at least a part of the display area of the 3D display is the all first color image, said at least a part of the display area of the 3D display displays an all second color image in other viewing zones, and wherein the first color is different from the second color.

24. The measurement device as claimed in claim 16, wherein when at least a part of a display area of the 3D display displays an image of one of the viewing zones, the processing unit stores light radiation amounts of a plurality of first positions in the at least a part of the display area of the 3D display that are detected by the light detector from the viewing angles, and selects a viewing angle with a local maximum light radiation amount in the viewing angles of each of the measured first positions as a reference viewing angle, and takes a plurality of intersections of a plurality of reference axes extending from the first positions along the reference viewing angles of the first positions as a plurality of detection positions, the processing unit stores light radiation amounts of a plurality of second positions in the at least a part of the display area of the 3D display that are detected at the detection positions, and the processing unit selects a distance between the detection position at which light radiation amounts of the second positions are most uniform and the 3D display as the optimal viewing distance, wherein the first positions are different from each other, and the second positions are different from each other.

25. The measurement device as claimed in claim 24, wherein selecting the distance between the detection position at which light radiation amounts of the second positions are most uniform and the 3D display as the optimal viewing distance comprises:

dividing a minimum value in the light radiation amounts of the second positions detected at each of the detection positions by a maximum value therein to obtain a ratio; and taking a distance between the detection position corresponding to a maximum ratio and the 3D display as the optimal viewing distance.

26. The measurement device as claimed in claim 24, wherein at least a part of the second positions are respectively at least a part of the first positions.

27. The measurement device as claimed in claim 24, wherein the image of one of the viewing zones displayed on said at least a part of the display area of the 3D display is an all first color image.

28. The measurement method as claimed in claim 27, wherein said all first color image is an all white image.

29. The measurement device as claimed in claim 27, wherein when the image of one of the viewing zones displayed on said at least a part of the display area of the 3D display is the all first color image, said at least a part of the display area of the 3D display displays an all second color image in other viewing zones, wherein the first color is different from the second color.

30. The measurement device as claimed in claim 16, wherein the light detector is a luminance meter, and the light radiation amount is luminance.

31. A measurement method adapted to measure an optimal viewing distance of a three-dimensional (3D) display, the 3D display being adapted to produce a plurality of viewing zones, the measurement method comprising:

configuring the 3D display to display images of a plurality of points in one of the viewing zones;

detecting light radiation amounts of the points with a light detector on a plurality of light receiving planes departed from the 3D display by a plurality of different distances; and selecting a distance of the light receiving plane at which light radiation amounts of the points are most uniform as the optimal viewing distance.

32. The measurement method as claimed in claim 31, wherein light radiation amounts of the images of the points displayed by the 3D display in one of the viewing zones are substantially the same.

* * * * *